United States Patent
Okada et al.

(10) Patent No.: US 12,325,784 B2
(45) Date of Patent: Jun. 10, 2025

(54) ELASTOMER AND MOLDED BODY

(71) Applicant: SUMITOMO BAKELITE CO., LTD., Tokyo (JP)

(72) Inventors: Jun Okada, Tokyo (JP); Mariko Otani, Tokyo (JP); Motoki Sato, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 477 days.

(21) Appl. No.: 17/059,521

(22) PCT Filed: Apr. 19, 2019

(86) PCT No.: PCT/JP2019/016788
§ 371 (c)(1),
(2) Date: Nov. 30, 2020

(87) PCT Pub. No.: WO2019/235083
PCT Pub. Date: Dec. 12, 2019

(65) Prior Publication Data
US 2021/0206942 A1 Jul. 8, 2021

(30) Foreign Application Priority Data

Jun. 8, 2018 (JP) ................................. 2018-110490

(51) Int. Cl.
*C08L 83/04* (2006.01)
*C08K 3/36* (2006.01)

(52) U.S. Cl.
CPC ................ *C08K 3/36* (2013.01); *C08L 83/04* (2013.01)

(58) Field of Classification Search
CPC ......... C08G 77/12; C08G 77/20; C08L 83/04; C08K 3/36; B01J 23/42
See application file for complete search history.

(56) References Cited

U.S. PATENT DOCUMENTS

| | | | | |
|---|---|---|---|---|
| 5,008,305 A | * | 4/1991 | Kennan | C09C 1/3081 106/490 |
| 5,306,766 A | * | 4/1994 | Omura | C08K 3/36 524/789 |
| 5,804,631 A | * | 9/1998 | Mine | C08K 3/08 524/440 |
| 8,338,528 B2 | * | 12/2012 | Scholz | C08K 9/06 524/588 |
| 8,814,754 B2 | | 8/2014 | Weast et al. | |
| 8,974,349 B2 | | 3/2015 | Weast et al. | |
| 9,011,292 B2 | | 4/2015 | Weast et al. | |
| 9,259,615 B2 | | 2/2016 | Weast et al. | |
| 9,289,649 B2 | | 3/2016 | Weast et al. | |
| 9,314,665 B2 | | 4/2016 | Weast et al. | |
| 9,375,608 B2 | | 6/2016 | Weast et al. | |
| 9,383,220 B2 | | 7/2016 | Crankson et al. | |
| 9,415,266 B2 | | 8/2016 | Weast et al. | |
| 9,474,955 B2 | | 10/2016 | Cobbett et al. | |
| 9,539,486 B2 | | 1/2017 | Weast et al. | |
| 9,616,289 B2 | | 4/2017 | Weast et al. | |
| 9,734,477 B2 | | 8/2017 | Weast et al. | |
| 9,750,976 B2 | | 9/2017 | Weast et al. | |
| 9,757,640 B2 | | 9/2017 | Weast et al. | |
| 10,444,791 B2 | | 10/2019 | Cobbett et al. | |
| 10,456,623 B2 | | 10/2019 | Weast et al. | |
| 10,674,612 B2 | | 6/2020 | Shibata et al. | |
| 11,147,166 B2 | | 10/2021 | Shibata et al. | |
| 11,330,721 B2 | | 5/2022 | Shibata et al. | |
| 2008/0033071 A1 | * | 2/2008 | Irmer | C08L 83/04 522/66 |
| 2008/0064811 A1 | * | 3/2008 | Todoroki | C08L 83/04 524/588 |
| 2014/0018464 A1 | * | 1/2014 | Senoo | A61L 29/042 523/105 |
| 2015/0274929 A1 | * | 10/2015 | Brick | C08L 83/00 428/36.9 |
| 2017/0325336 A1 | | 11/2017 | Shibata et al. | |
| 2018/0288882 A1 | | 10/2018 | Shibata et al. | |
| 2019/0366157 A1 | | 12/2019 | Weast et al. | |
| 2020/0253059 A1 | | 8/2020 | Shibata et al. | |

FOREIGN PATENT DOCUMENTS

| | | |
|---|---|---|
| JP | 2015-515287 | 5/2015 |
| JP | 2018-053237 | 4/2018 |
| JP | 2018-070866 | 5/2018 |
| JP | 2018-070867 | 5/2018 |
| KR | 10-2004-0053395 | 6/2004 |
| KR | 10-2017-0085029 | 7/2017 |

OTHER PUBLICATIONS

Chinese Office Action and Search Report for Chinese Patent Application No. 201980038941.5 mailed Dec. 16, 2021.
Hum, "Repair and Reconstruction Surgery", Person Health Press, p. 101, Jan. 2001.
International Search Report and Written Opinion for International Application No. PCT/JP2019/016788 mailed on Jun. 18, 2019, 7 pages.
Evonik, Product Catalog, Aerosil Japan, Ltd, 10th edition, 2023.

* cited by examiner

*Primary Examiner* — Margaret G Moore
(74) *Attorney, Agent, or Firm* — Amin, Turocy & Watson, LLP

(57) ABSTRACT

An elastomer of the present invention is used for a molded body for low temperature environments, includes a silicone rubber, and has a characteristic in which the expression ((tensile stress $M_{100}$–tensile stress $M_{100}0$)/tensile stress $M_{100}0$)×100 is equal to or more than a predetermined value and equal to or less than a predetermined value, where the tensile stress $M_{100}$ and the tensile stress $M_{100}0$ are respectively obtained under two different measurement conditions of performing or not performing a cooling treatment of maintaining −40° C. for 30 minutes.

14 Claims, No Drawings

ELASTOMER AND MOLDED BODY

TECHNICAL FIELD

The present invention relates to an elastomer and a molded body.

BACKGROUND ART

Various studies have been conducted so far on elastomers for wearable devices. As this type of technique, for example, a technique disclosed in Patent Document 1 is known. Patent Document 1 discloses that polyurethane is used for an outer case member of a wearable device (paragraph 0031, FIG. 2, and the like of Patent Document 1).

RELATED DOCUMENT

Patent Document

[Patent Document 1] PCT Japanese Translation Patent Publication No. 2015-515287

SUMMARY OF THE INVENTION

Technical Problem

However, the inventors of the present invention have conducted studies and have found that the polyurethane disclosed in Patent Document 1 has room for improvement from the viewpoint of rubber characteristics in low temperature environments.

Solution to Problem

The inventors of the present invention have found that it is possible to appropriately control a state of characteristics of rubber in an elastomer in low temperature environments by using, as an index, a degree of change in physical properties of the elastomer when it is cooled from room temperature to a low temperature (change in physical properties in cooling and heating). They have conducted further studies, and it has been elucidated that it is possible to stably evaluate characteristics such as bending and elongation of rubber in an elastomer in low temperature environments by adopting, as an index, a degree of change in tensile stress at a given elongation as change in physical properties in cooling and heating.

The inventors of the present invention have made further diligent research based on such findings. They have found that it is possible to inhibit a deterioration of characteristics of rubber in an elastomer in low temperature environments by adopting, as an index, a degree of change in tensile stress at a given elongation before and after cooling, and reducing the degree of change in tensile stress at a given elongation to be equal to or less than a predetermined value, and therefore have completed the present invention.

According to the present invention, the following aspect is provided.

An elastomer in which ((tensile stress $M_{100}$−tensile stress $M_{100}0$)/tensile stress $M_{100}0$)×100 measured under the following conditions is equal to or more than −20% and equal to or less than 100%.

(Conditions)

Tensile stress $M_{100}$ at a given elongation: a stress at 100% elongation of the elastomer which is measured at −40° C. according to JIS K 6251 (2004) after maintaining the elastomer at −40° C. for 30 minutes.

Tensile stress $M_{100}0$ at a given elongation: a stress at 100% elongation of the elastomer which is measured at 25° C. according to JIS K 6251 (2004) without subjecting the elastomer to a further cooling treatment.

According to the present invention, the following aspect is further provided.

A molded body including the above-described elastomer.

According to the present invention, the following aspect is further provided.

A method of using an elastomer, the method including:

a step of forming a molded body using the above-described elastomer, in which, in the above-described elastomer, ((tensile stress $M_{100}$−tensile stress $M_{100}0$)/tensile stress $M_{100}0$)×100 measured under the following conditions is equal to or more than −20% and equal to or less than 100%.

Advantageous Effects of Invention

According to the present invention, an elastomer and a molded body, which have excellent rubber characteristics in low temperature environments, are provided.

DESCRIPTION OF EMBODIMENTS

An outline of an elastomer of the present embodiment will be described.

An elastomer of the present embodiment may a characteristic in which ((tensile stress $M_{100}$−tensile stress $M_{100}0$)/tensile stress $M_{100}0$)×100 measured under the following conditions is equal to or more than −20% and equal to or less than 100%.

(Conditions)

Tensile stress $M_{100}0$ at a given elongation: a stress at 100% elongation of the elastomer which is measured at 25° C. according to JIS K 6251 (2004) without subjecting the elastomer to a further cooling treatment.

Tensile stress $M_{100}$ at a given elongation: a stress at 100% elongation of the elastomer which is measured at −40° C. according to JIS K 6251 (2004) after maintaining the elastomer at −40° C. for 30 minutes.

The studies focusing on a deterioration of characteristics of rubber in a cooled elastomer have proceeded by the inventors of the present invention. As a result, the inventors of the present invention have found that it is possible to appropriately control a state of characteristics of rubber in an elastomer in low temperature environments by using, as an index, a degree of change in physical properties of the elastomer when it is cooled from room temperature to a low temperature (change in physical properties in cooling and heating). They have conducted further studies, and it has been elucidated that it is possible to stably evaluate characteristics such as bending and elongation of rubber in an elastomer in low temperature environments by adopting, as an index, a degree of change in tensile stress at a given elongation as change in physical properties in cooling and heating, and by appropriately selecting cooling conditions for this index.

According to the elastomer of the present embodiment, by setting a degree of change in tensile stress at a given elongation before and after cooling, that is, ((tensile stress $M_{100}$−tensile stress $M_{100}0$)/tensile stress $M_{100}0$)×100 to be equal to or less than the above-mentioned upper limit value, it is possible to realize an elastomer in which rubber characteristics are excellent in low temperature use environments.

In addition, since such an elastomer is an elastomer which is for low temperature environments and in which variation in characteristics due to cooling is inhibited, it can be suitably used for a molded body for various usage applications such as usage applications in which a cooling treatment is performed, and usage applications in low temperature environments.

Furthermore, the elastomer of the present embodiment can be processed and molded into various shapes such as a sheet shape, a cylinder shape, and a bag shape.

A molded body (molded article) including the elastomer of the present embodiment can be applied to, for example, a wearable device that can be worn on the body or clothes. Examples of wearable devices include medical sensors for detecting phenomena from the living body, such as heart rate, electrocardiogram, blood pressure, and body temperature, healthcare devices, foldable displays, stretchable LED arrays, stretchable solar cells, stretchable antennas, stretchable batteries, actuators, wearable computers, and the like. The molded body can be used as member constituting electrodes, wirings, substrates, movable members that stretch or bend, exterior members, and the like used for the above devices.

In particular, the molded body of the present embodiment can be suitably used not only in normal room temperature environments but also for usage applications requiring low temperature environments such as a refrigerated facility, a cold weather region, and a cold climate. Accordingly, it is possible to form a molded body having a cool tolerance temperature of −40° C. by using the elastomer of the present embodiment.

It is sufficient for an upper limit of temperatures in low temperature environments to be lower than room temperature 25° C., and it may be, for example, equal to or lower than 5° C., equal to or lower than 0° C., or equal to or lower than −1° C. A lower limit of temperatures in the low temperature environments is not particularly limited, but it may be equal to or higher than −40° C.

Next, characteristics of the elastomer of the present embodiment will be described.

In the elastomer of the present embodiment, an upper limit value of ((tensile stress $M_{100}$−tensile stress $M_{100}0$)/tensile stress $M_{100}0$)×100 is, for example, equal to or less than 100%, is preferably equal to or less than 50%, is more preferably equal to or less than 30%, is even more preferably equal to or less than 20%, and is still more preferably equal to or less than 13%. Accordingly, it is possible to inhibit a deterioration of characteristics of rubber in the elastomer in low temperature environments. Meanwhile, a lower limit value of ((tensile stress $M_{100}$−tensile stress $M_{100}0$)/tensile stress $M_{100}0$)×100 is, for example, equal to or more than −20%, is preferably equal to or more than −15%, and is more preferably equal to or more than −10%. Accordingly, it is possible to inhibit a deterioration of characteristics of rubber in the elastomer in low temperature environments.

(Measurement Conditions for Tensile Stress)

Tensile stress $M_{100}$ at a given elongation: a stress at 100% elongation of the elastomer which is measured at −40° C. according to JIS K 6251 (2004) after maintaining the elastomer at −40° C. for 30 minutes.

Tensile stress $M_{100}0$ at a given elongation: a stress at 100% elongation of the elastomer which is measured at 25° C. according to JIS K 6251 (2004) without subjecting the elastomer to a further cooling treatment.

In the elastomer of the present embodiment, an upper limit value of ((elongation at break BE−elongation at break BEO)/elongation at break BEO)×100 is not particularly limited, but it may be, for example, equal to or less than 20%, equal to or less than 15%, or equal to or less than 10%. Accordingly, it is possible to realize a balance with other physical properties. Meanwhile, a lower limit value of ((elongation at break BE−elongation at break BEO)/elongation at break BEO)×100 is, for example, equal to or more than −40%, is preferably equal to or more than −30%, and is more preferably equal to or more than −15%. Accordingly, it is possible to inhibit changes in high stretchability and durability of the elastomer in low temperature environments.

In the elastomer of the present embodiment, an upper limit value of the elongation at break BE may be, for example, equal to or less than 1,500%, is preferably equal to or less than 1,200%, is more preferably equal to or less than 1,000%, and is even more preferably equal to or less than 900%. Accordingly, it is possible to improve mechanical strength of the elastomer in low temperature environments. Meanwhile, a lower limit value of the elongation at break BE is equal to or more than 250%, is preferably equal to or more than 350%, and is more preferably equal to or more than 400%. Accordingly, it is possible to improve high stretchability and durability of the elastomer in low temperature environments.

(Measurement Conditions for Elongation at Break)

Elongation at break BE: an elongation at break of the elastomer which is measured at −40° C. according to JIS K 6251 (2004) after maintaining the elastomer at −40° C. for 30 minutes.

Elongation at break BEG: an elongation at break of the elastomer which is measured at 25° C. according to JIS K 6251 (2004) without subjecting the elastomer to a further cooling treatment.

In the elastomer of the present embodiment, an upper limit value of ((tensile strength S−tensile strength S0)/tensile strength S0)×100 is, for example, equal to or less than 80%, is preferably equal to or less than 60%, is more preferably equal to or less than 40%, and is equal to or less than 30%. Accordingly, it is possible to inhibit variation in characteristics of rubber in low temperature environments. Meanwhile, a lower limit value of ((tensile strength S−tensile strength S0)/tensile strength S0)×100 is, for example, equal to or more than −20%, is preferably equal to or more than −15%, and is more preferably equal to or more than −10%. By setting a lower limit value to be equal to or more than the above-mentioned lower limit value, it is possible to improve mechanical strength of the elastomer in low temperature environments.

(Measurement Conditions for Tensile Strength)

Tensile strength S: a tear strength of the elastomer which is measured at −40° C. according to JIS K 6252 (2001) after maintaining the elastomer at −40° C. for 30 minutes.

Tensile strength S0: a tensile strength of the elastomer which is measured at 25° C. according to JIS K 6252 (2001) without subjecting the elastomer to a further cooling treatment.

In the elastomer of the present embodiment, an upper limit value of ((tear strength TS−tear strength TS0)/tear strength TS0)×100 is, for example, equal to or less than 120%, is preferably equal to or less than 80%, is more preferably equal to or less than 50%, and is equal to or less than 40%. Accordingly, it is possible to inhibit variation in characteristics of rubber in low temperature environments. Meanwhile, a lower limit value of ((tear strength TS−tear strength TS0)/tear strength TS0)×100 is, for example, equal to or more than −20%, is preferably equal to or more than −15%, and is more preferably equal to or more than −10%. By setting a lower limit value to be equal to or more than the above-mentioned lower limit value, it is possible to improve scratch resistance and mechanical strength of the elastomer in low temperature environments.
(Measurement Conditions for Tear Strength)

Tear strength TS: a tear strength of the elastomer which is measured at −40° C. according to JIS K 6252 (2001) after maintaining the elastomer at −40° C. for 30 minutes.

Tear strength TS0: a tear strength of the elastomer which is measured at 25° C. according to JIS K 6252 (2001) without subjecting the elastomer to a further cooling treatment.

In the elastomer of the present embodiment, an upper limit value of a durometer hardness (hardness A0), which is obtained at 25° C. without subjecting the elastomer to a further cooling treatment and is defined by JIS K 6253 (1997), may be equal to or less than 80, and it is preferably equal to or less than 75, and is more preferably equal to or less than 70. Accordingly, it is possible to realize a balance with various physical properties of the elastomer. Meanwhile, a lower limit value of the hardness A0 may be, for example, equal to or more than 20, is preferably equal to or more than 22, and is more preferably equal to or more than 25. Accordingly, mechanical strength of the elastomer at room temperature is improved, and deformation due to external force is inhibited, and thereby shape retainability can be improved.

In the present embodiment, it is possible to control the above-mentioned hardness, tensile stress, elongation at break, tensile strength, and tear strength by, for example, appropriately selecting the type and a blending amount of each component contained in the elastomer, a method of preparing a composition for forming the elastomer, and the like. Among them, for example, appropriate control of the type and a blending ratio of a resin constituting the elastomer, a crosslink density, a crosslinked structure, and the like of the resin; improvement of a blending ratio of an inorganic filling material and dispersibility of the inorganic filling material; and the like are elements for setting the above-mentioned hardness, tensile stress, elongation at break, tensile strength, and tear strength within desired numerical value ranges.

A composition of the elastomer of the present embodiment will be described below.

The elastomer may include silicone rubber from the viewpoint of being chemically stable and having excellent heat stability.

The heat-curable elastomer may be composed of a cured product of a curable elastomer composition. Furthermore, the silicone rubber may be composed of a cured product of a silicone rubber-based curable composition.

Furthermore, arbitrary components capable of exhibiting various functions may be added to the molded body of the present embodiment. For example, the elastomer may include an inorganic filling material from the viewpoint of increasing mechanical strength. As the inorganic filling material, a known inorganic filling material can be used, and for example, silica particles can be used.

Hereinafter, a case in which a silicone rubber-based curable composition is used as silicone rubber, which is an example of the elastomer of the present embodiment, will be described.

A silicone rubber-based curable composition of the present embodiment may include a vinyl group-containing organopolysiloxane (A). The vinyl group-containing organopolysiloxane (A) is a polymer that serves as a main component of the silicone rubber-based curable composition of the present embodiment.

The vinyl group-containing organopolysiloxane (A) may include a vinyl group-containing linear organopolysiloxane (A1) having a linear structure.

The vinyl group-containing linear organopolysiloxane (A1) has a linear structure and contains a vinyl group, and this vinyl group serves as a crosslinking point during curing.

A content of vinyl groups of the vinyl group-containing linear organopolysiloxane (A1) is not particularly limited, but for example, it is preferable that two or more vinyl groups be contained in a molecule, and a content thereof be equal to or less than 15 mol %, and it is more preferable that two or more vinyl groups be contained in a molecule, and a content thereof be 0.01 to 12 mol %. Accordingly, an amount of vinyl groups in the vinyl group-containing linear organopolysiloxane (A1) is optimized, and it is possible to reliably form a network with each component to be described later. In the present embodiment, the term "to" means that numerical values at both ends thereof are included.

In addition, in the present specification, a content of vinyl groups is mol % of vinyl group-containing siloxane units in a case where all units constituting the vinyl group-containing linear organopolysiloxane (A1) are 100 mol %. However, it is thought that there is one vinyl group for one vinyl group-containing siloxane unit.

In addition, a degree of polymerization of the vinyl group-containing linear organopolysiloxane (A1) is not particularly limited, but it is, for example, preferably within a range of about 1,000 to 10,000, and more preferably within a range of about 2,000 to 5,000. The degree of polymerization can be obtained as, for example, an average degree of polymerization (or number average molecular weight) in terms of polystyrene by gel permeation chromatography (GPC) in which chloroform is used as a developing solvent.

Furthermore, a specific gravity of the vinyl group-containing linear organopolysiloxane (A1) is not particularly limited, but it is preferably within a range of about 0.9 to 1.1.

By using a substance having a degree of polymerization and a specific gravity within the above-mentioned ranges as the vinyl group-containing linear organopolysiloxane (A1), it is possible to achieve improvement of heat resistance, flame retardance, chemical stability, and the like of silicone rubber to be obtained.

The vinyl group-containing linear organopolysiloxane (A1) is particularly preferably a substance having a structure represented by Formula (1).

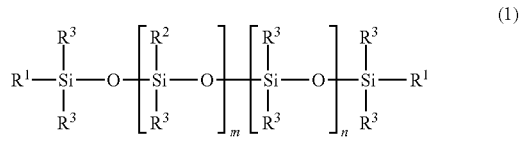

(1)

In Formula (1), $R^1$ is a substituted or unsubstituted alkyl group, alkenyl group, or aryl group, which has 1 to 10 carbon atoms, or a hydrocarbon group obtained by combining these groups. Examples of alkyl groups having 1 to 10 carbon atoms include a methyl group, an ethyl group, a propyl group, and the like, and among them, a methyl group is preferable. Examples of alkenyl groups having 1 to 10 carbon atoms include a vinyl group, an allyl group, a butenyl group, and the like, and among them, a vinyl group is preferable. Examples of aryl groups having 1 to 10 carbon atoms include a phenyl group and the like.

In addition, $R^2$ is a substituted or unsubstituted alkyl group, alkenyl group, or aryl group, which has 1 to 10 carbon atoms, or a hydrocarbon group obtained by combining these groups. Examples of alkyl groups having 1 to 10 carbon atoms include a methyl group, an ethyl group, a propyl group, and the like, and among them, a methyl group is preferable. Examples of alkenyl groups having 1 to 10 carbon atoms include a vinyl group, an allyl group, and a butenyl group. Examples of aryl groups having 1 to 10 carbon atoms include a phenyl group.

In addition, $R^3$ is a substituted or unsubstituted alkyl group or aryl group, which has 1 to 8 carbon atoms, or a hydrocarbon group obtained by combining these groups. Examples of alkyl groups having 1 to 8 carbon atoms include a methyl group, an ethyl group, a propyl group, and the like, and among them, a methyl group is preferable. Examples of aryl groups having 1 to 8 carbon atoms include a phenyl group.

Furthermore, in Formula (1), examples of substituents of $R^1$ and $R^2$ include a methyl group, a vinyl group, and the like, and examples of substituents of $R^3$ include a methyl group and the like.

In Formula (1), a plurality of $R^1$'s are independent from each other, and they may be the same as or different from each other. Furthermore, the same applies to $R^2$ and $R^3$.

Furthermore, m and n are the number of repeating units constituting the vinyl group-containing linear organopolysiloxane (A1) represented by Formula (1), where m is an integer of 0 to 2,000, and n is an integer of 1,000 to 10,000. m is preferably 0 to 1,000, and n is preferably 2,000 to 5,000.

A specific structure of the vinyl group-containing linear organopolysiloxane (A1) represented by Formula (1) includes, for example, a structure represented by Formula (1-1).

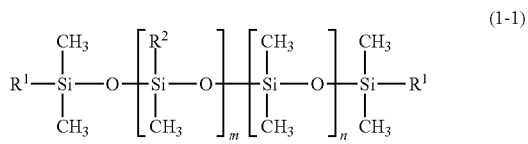

In Formula (1-1), $R^1$ and $R^2$ are each independently a methyl group or a vinyl group, and at least one of them is a vinyl group.

Furthermore, the vinyl group-containing linear organopolysiloxane (A1) is preferably a substance containing a first vinyl group-containing linear organopolysiloxane (A1-1) in which two or more vinyl groups are contained in a molecule, and a content of vinyl groups is equal to or less than 0.4 mol %, and a second vinyl group-containing linear organopolysiloxane (A1-2) in which a content of vinyl groups is 0.5 to 15 mol %. By combining the first vinyl group-containing linear organopolysiloxane (A1-1) having a general content of vinyl groups with the second vinyl group-containing linear organopolysiloxane (A1-2) having a high content of vinyl groups as raw rubber which is a raw material of silicone rubber, vinyl groups can be unevenly distributed, and thereby it is possible to more effectively form sparseness and denseness in crosslink density in a crosslinked network of silicone rubber. As a result, a tear strength of the silicone rubber can be increased more effectively.

Specifically, as the vinyl group-containing linear organopolysiloxane (A1), it is preferable to use, for example, the first vinyl group-containing linear organopolysiloxane (A1-1) in which two or more of a unit in which $R^1$ is a vinyl group and/or a unit in which $R^2$ is a vinyl group are contained in a molecule, and a content thereof is equal to or less than 0.4 mol % in Formula (1-1), and the second vinyl group-containing linear organopolysiloxane (A1-2) in which a content of a unit in which $R^1$ is a vinyl group and/or a unit in which $R^2$ is a vinyl group is 0.5 to 15 mol % in Formula (1-1).

Furthermore, in the first vinyl group-containing linear organopolysiloxane (A1-1), a content of vinyl groups is preferably 0.01 to 0.2 mol %. Furthermore, in the second vinyl group-containing linear organopolysiloxane (A1-2), a content of vinyl groups is preferably 0.8 to 12 mol %.

Furthermore, in a case where the first vinyl group-containing linear organopolysiloxane (A1-1) and the second vinyl group-containing linear organopolysiloxane (A1-2) are combined and blended, a ratio of (A1-1) to (A1-2) is not particularly limited, but for example, (A1-1):(A1-2) is preferably 50:50 to 95:5 in a weight ratio, and more preferably 80:20 to 90:10 in a weight ratio.

One kind of each of the first vinyl group-containing linear organopolysiloxane (A1-1) and the second vinyl group-containing linear organopolysiloxane (A1-2) may be used alone, or two or more kinds thereof may be used in combination.

Furthermore, the vinyl group-containing organopolysiloxane (A) may contain a vinyl group-containing branched organopolysiloxane (A2) having a branched structure.

<<Organohydrogenpolysiloxane (B)>>

The silicone rubber-based curable composition of the present embodiment may contain an organohydrogenpolysiloxane (B).

The organohydrogenpolysiloxane (B) is classified into a linear organohydrogenpolysiloxane (B1) having a linear structure and a branched organohydrogenpolysiloxane (B2) having a branched structure, and among them, one or both may be contained.

The linear organohydrogenpolysiloxane (B1) is a polymer which has a linear structure, has a structure (≡Si—H) in which hydrogen is directly bonded to Si, and undergoes a hydrosilylation reaction with vinyl groups of components blended in the silicone rubber-based curable composition in addition to vinyl groups of the vinyl group-containing organopolysiloxane (A) to crosslink these components.

A molecular weight of the linear organohydrogenpolysiloxane (B1) is not particularly limited, but for example, a weight-average molecular weight thereof is preferably equal to or less than 20,000, and more preferably equal to or more than 1,000 and equal to or less than 10,000.

A weight-average molecular weight of the linear organohydrogenpolysiloxane (B1) can be measured in terms of polystyrene and by gel permeation chromatography (GPC) in which chloroform is used as a developing solvent.

In addition, in general, the linear organohydrogenpolysiloxane (B1) preferably does not have a vinyl group. Accordingly, it is possible to adequately prevent a crosslinking reaction from proceeding in a molecule of the linear organohydrogenpolysiloxane (B1).

As the linear organohydrogenpolysiloxane (B1) described above, for example, a substance having a structure represented by Formula (2) is preferably used.

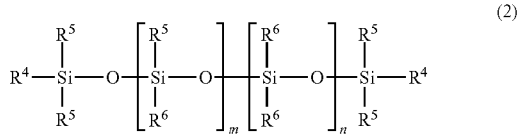

(2)

In Formula (2), $R^4$ is a substituted or unsubstituted alkyl group, alkenyl group, or aryl group, which has 1 to 10 carbon atoms, a hydrocarbon group obtained by combining these groups, or a hydrido group. Examples of alkyl groups having 1 to 10 carbon atoms include a methyl group, an ethyl group, a propyl group, and the like, and among them, a methyl group is preferable. Examples of alkenyl groups having 1 to 10 carbon atoms include a vinyl group, an allyl group, a butenyl group, and the like. Examples of aryl groups having 1 to 10 carbon atoms include a phenyl group.

In addition, $R^5$ is a substituted or unsubstituted alkyl group, alkenyl group, or aryl group, which has 1 to 10 carbon atoms, a hydrocarbon group obtained by combining these groups, or a hydrido group. Examples of alkyl groups having 1 to 10 carbon atoms include a methyl group, an ethyl group, and a propyl group, and among them, a methyl group is preferable. Examples of alkenyl groups having 1 to 10 carbon atoms include a vinyl group, an allyl group, a butenyl group, and the like. Examples of aryl groups having 1 to 10 carbon atoms include a phenyl group.

In Formula (2), a plurality of $R^4$'s are independent from each other, and they may be the same as or different from each other. The same applies to $R^5$. However, at least two or more of the plurality of $R^4$'s and $R^5$'s are hydrido groups.

In addition, $R^6$ is a substituted or unsubstituted alkyl group or aryl group, which has 1 to 8 carbon atoms, or a hydrocarbon group obtained by combining these groups. Examples of alkyl groups having 1 to 8 carbon atoms include a methyl group, an ethyl group, a propyl group, and the like, and among them, a methyl group is preferable. Examples of aryl groups having 1 to 8 carbon atoms include a phenyl group. A plurality of $R^6$'s are independent from each other, and they may be the same as or different from each other.

In addition, examples of substituents of $R^4$, $R^5$, and $R^6$ in Formula (2) include a methyl group, a vinyl group, and the like, and a methyl group is preferable from the viewpoint of preventing an intramolecular crosslinking reaction.

Furthermore, m and n are the number of repeating units constituting the linear organohydrogenpolysiloxane (B1) represented by Formula (2), where m is an integer of 2 to 150, and n is an integer of 2 to 150. m is preferably an integer of 2 to 100, and n is preferably an integer of 2 to 100.

One kind of the linear organohydrogenpolysiloxane (B1) may be used alone, or two or more kinds thereof may be used in combination.

Since the branched organohydrogenpolysiloxane (B2) has a branched structure, it is a component which forms a region having a high crosslink density and thereby greatly contributes to formation of a structure having sparseness and denseness in crosslink density in a silicone rubber-based system. Furthermore, similarly to the linear organohydrogenpolysiloxane (B1), it is a polymer which has a structure (≡Si—H) in which hydrogen is directly bonded to Si, and undergoes a hydrosilylation reaction with vinyl groups of components blended in the silicone rubber-based curable composition in addition to vinyl groups of the vinyl group-containing organopolysiloxane (A) to crosslink these components.

Furthermore, a specific gravity of the branched organohydrogenpolysiloxane (B2) is within a range of 0.9 to 0.95.

In general, the branched organohydrogenpolysiloxane (B2) preferably does not have a vinyl group. Accordingly, it is possible to adequately prevent a crosslinking reaction from proceeding in a molecule of the branched organohydrogenpolysiloxane (B2).

In addition, the branched organohydrogenpolysiloxane (B2) is preferably a substance represented by Average Composition Formula (c).

Average Composition Formula (c)

(In Formula (c), $R^7$ is a monovalent organic group, a is an integer within a range of 1 to 3, m is the number of $H_a(R^7)_{3-a}SiO_{1/2}$ units, and n is the number of $SiO_{4/2}$ units.)

In Formula (c), $R^7$ is a monovalent organic group, and is preferably a substituted or unsubstituted alkyl group or aryl group, which has 1 to 10 carbon atoms, or a hydrocarbon group obtained by combining these groups. Examples of alkyl groups having 1 to 10 carbon atoms include a methyl group, an ethyl group, a propyl group, and the like, and among them, a methyl group is preferable. Examples of aryl groups having 1 to 10 carbon atoms include a phenyl group.

In Formula (c), a is the number of hydrido groups (hydrogen atoms directly bonded to Si), and it is an integer within a range of 1 to 3, and is preferably 1.

In addition, in Formula (c), m is the number of $H_a(R^7)_{3-a}SiO_{1/2}$ units, and n is the number of $SiO_{4/2}$ units.

The branched organohydrogenpolysiloxane (B2) has a branched structure. The linear organohydrogenpolysiloxane (B1) and the branched organohydrogenpolysiloxane (B2) are different in that their structures are linear or branched. When the number of Si is 1, the number of alkyl groups R (R/Si) bonded to Si is 1.8 to 2.1 for the linear organohydrogenpolysiloxane (B1), and is 0.8 to 1.7 for the branched organohydrogenpolysiloxane (B2).

Since the branched organohydrogenpolysiloxane (B2) has a branched structure, when it is heated to, for example, 1,000° C. at a temperature rising rate of 10° C./min in a nitrogen atmosphere, an amount of residues is equal to or more than 5%. On the other hand, since the linear organohydrogenpolysiloxane (B1) is linear, an amount of residues after it is heated under the above conditions is almost zero.

In addition, specific examples of the branched organohydrogenpolysiloxane (B2) include a substance having a structure represented by Formula (3).

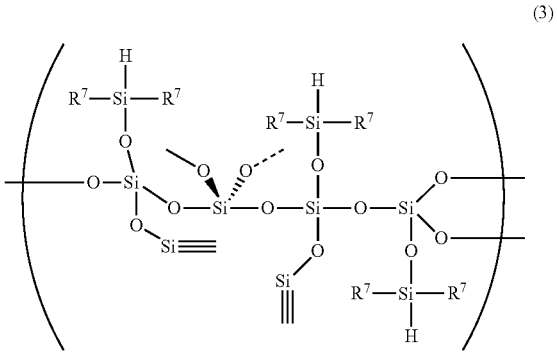

(3)

In Formula (3), $R^7$ is a substituted or unsubstituted alkyl group or aryl group, which has 1 to 8 carbon atoms, a hydrocarbon group obtained by combining these groups, or a hydrogen atom. Examples of alkyl groups having 1 to 8 carbon atoms include a methyl group, an ethyl group, a propyl group, and the like, and among them, a methyl group is preferable. Examples of aryl groups having 1 to 8 carbon atoms include a phenyl group. Examples of substituents of $R^7$ include a methyl group and the like.

In Formula (3), a plurality of $R^7$'s are independent from each other, and they may be the same as or different from each other.

Furthermore, in Formula (3), "—O-Si≡" represents that Si has a branched structure that spreads three-dimensionally.

One kind of the branched organohydrogenpolysiloxane (B2) may be used alone, or two or more kinds thereof may be used in combination.

In addition, in the linear organohydrogenpolysiloxane (B1) and the branched organohydrogenpolysiloxane (B2), an amount of hydrogen atoms (hydrido groups) directly bonded to Si is not particularly limited. However, in the silicone rubber-based curable composition, a total amount of hydrido groups in the linear organohydrogenpolysiloxane (B1) and the branched organohydrogenpolysiloxane (B2) is preferably 0.5 to 5 mol and is more preferably 1 to 3.5 mol, with respect to 1 mol of vinyl groups in the vinyl group-containing linear organopolysiloxane (A1). Accordingly, a crosslinked network can be reliably formed between the linear organohydrogenpolysiloxane (B1) and the branched organohydrogenpolysiloxane (B2), and the vinyl group-containing linear organopolysiloxane (A1).

<<Silica Particles (C)>>

The silicone rubber-based curable composition of the present embodiment may include silica particles (C).

The silica particles (C) are not particularly limited, but for example, fumed silica, calcined silica, precipitated silica, and the like are used. These may be used alone, or two or more kinds thereof may be used in combination.

A specific surface area of the silica particles (C) according to a BET method is preferably, for example, 50 to 400 m²/g, and is more preferably 100 to 400 m²/g. An average primary particle size of the silica particles (C) is preferably, for example, 1 to 100 nm, and is more preferably about 5 to 20 nm.

By using the silica particles (C) having such a specific surface area and an average particle size within the above ranges, it is possible to improve hardness and mechanical strength, and particularly tensile strength of silicone rubber to be formed.

<<Silane Coupling Agent (D)>>

The silicone rubber-based curable composition of the present embodiment may include a silane coupling agent (D).

The silane coupling agent (D) may have a hydrolyzable group. The hydrolyzable group is hydrolyzed by water to form a hydroxyl group, and this hydroxyl group undergoes a dehydration condensation reaction with a hydroxyl group on a surface of the silica particles (C), whereby the surface of the silica particles (C) can be modified.

In addition, this silane coupling agent (D) may contain a silane coupling agent having a hydrophobic group. Since this hydrophobic group is imparted onto the surface of the silica particles (C), in the silicone rubber-based curable composition, that is, in silicone rubber, a cohesive force of the silica particles (C) is reduced (aggregation due to hydrogen bonds due to silanol groups is reduced), and it is presumed that, as a result, dispersibility of the silica particles in the silicone rubber-based curable composition is improved. Thereby, an interface between the silica particles and the rubber matrix increases, and a reinforcing effect of the silica particles increases. Furthermore, it is presumed that when the rubber is deformed into the matrix, slipperiness of the silica particles in the matrix is improved. In addition, mechanical strength (for example, tensile strength or tear strength) of the silicone rubber due to the silica particles (C) is improved by improving dispersibility and slipperiness of the silica particles (C).

Furthermore, the silane coupling agent (D) may include a silane coupling agent having a vinyl group. Accordingly, a vinyl group is introduced on the surface of the silica particles (C). Accordingly, when the silicone rubber-based curable composition is cured, that is, when a vinyl group contained in the vinyl group-containing organopolysiloxane (A) and a hydrido group contained in the organohydrogenpolysiloxane (B) undergo a hydrosilylation reaction, and thereby a network (crosslinked structure) is formed, a vinyl group contained in the silica particles (C) also participates in the hydrosilylation reaction with the hydrido group contained in the organohydrogenpolysiloxane (B), and therefore, the silica particles (C) are also incorporated in the network. Accordingly, it is possible to reduce a hardness and increase a modulus of the formed silicone rubber.

As the silane coupling agent (D), a silane coupling agent having a hydrophobic group and a silane coupling agent having a vinyl group can be used in combination.

Examples of the silane coupling agent (D) include an agent represented by Formula (4).

$$Y_n—Si—(X)_{4-n} \qquad (4)$$

In Formula (4), n represents an integer of 1 to 3. Y represents a functional group selected from groups having a hydrophobic group, a hydrophilic group, or a vinyl group. When n is 1, a group is a hydrophobic group, and when n is 2 or 3, at least one of groups is a hydrophobic group. X represents a hydrolyzable group.

A hydrophobic group is an alkyl group or aryl group, which has 1 to 6 carbon atoms, or a hydrocarbon group obtained by combining these groups, and examples thereof include a methyl group, an ethyl group, a propyl group, a phenyl group, and the like, and among them, a methyl group is preferable.

Furthermore, examples of hydrophilic groups include a hydroxyl group, a sulfonic acid group, a carboxyl group, a carbonyl group, and the like, and among them, a hydroxyl group is particularly preferable. The hydrophilic group may be contained as a functional group, but it is preferably not contained from the viewpoint of imparting hydrophobicity to the silane coupling agent (D).

Furthermore, examples of hydrolyzable groups include an alkoxy group such as a methoxy group and an ethoxy group, a chloro group, a silazane group, and the like. Among them, a silazane group is preferable because it has high reactivity with the silica particles (C). An agent having a silazane group as a hydrolyzable group is an agent having two (Ye-Si—) structures in Formula (4) due to its structural characteristics.

Specific examples of the silane coupling agent (D) represented by Formula (4) include an agent having a hydrophobic group as a functional group, such as alkoxysilanes such as methyltrimethoxysilane, dimethyldimethoxysilane, phenyltrimethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, and decyltrimethoxysilane, chlorosilanes such as methyltrichlorosilane, dimethyldichlorosilane, trimethylchlorosilane, and phenyltrichlorosilane, and hexamethyldisilazane; an agent having a vinyl group as a functional group, such as alkoxysilanes such as methacryloxypropyltriethoxysilane, methacryloxypropyltrimethoxysilane, methacryloxypropylmethyldiethoxysilane, methacryloxypropylmethyldimethoxysilane, vinyltriethoxysilane, vinyltrimethoxysilane, and vinylmethyldimethoxysilane, chlorosilanes such as vinyltrichlorosilane and vinylmethyldichlorosilane, and divinyltetramethyldisilazane. Among them, hexamethyldisilazane having a hydrophobic group, and divinyltetramethyldisilazane having a vinyl group are particularly preferable when the above description is taken into consideration.

<<Platinum or Platinum Compound (E)>>

The silicone rubber-based curable composition of the present embodiment may contain platinum or a platinum compound (E).

Platinum or the platinum compound (E) is a catalyst component that acts as a catalyst during curing. An amount of platinum or the platinum compound (E) added is a catalytic amount.

As platinum or the platinum compound (E), known compounds can be used, and examples thereof include platinum black; a compound in which platinum is supported on silica, carbon black, and the like; chloroplatinic acid or an alcohol solution of chloroplatinic acid; complex salts of chloroplatinic acid and olefin; complex salts of chloroplatinic acid and vinyl siloxane; and the like.

In addition, one kind of platinum or the platinum compound (E) may be used alone, or two or more kinds thereof may be used in combination.

<<Water (F)>>

Furthermore, the silicone rubber-based curable composition of the present embodiment may contain water (F) in addition to the above-described components (A) to (E).

The water (F) is a component which functions as a dispersion medium for dispersing each of the components contained in the silicone rubber-based curable composition, and which contributes to a reaction between the silica particles (C) and the silane coupling agent (D). Accordingly, the silica particles (C) and the silane coupling agent (D) can be more reliably connected to each other in the silicone rubber, and uniform characteristics can be exhibited as a whole.

Furthermore, in addition to the above-described components (A) to (F), the silicone rubber-based curable composition of the present embodiment may contain known additives that are blended in the silicone rubber-based curable composition. Examples thereof include diatomaceous earth, iron oxide, zinc oxide, titanium oxide, barium oxide, magnesium oxide, cerium oxide, calcium carbonate, magnesium carbonate, zinc carbonate, glass wool, mica, and the like. In addition, a dispersant, a pigment, a dye, an antistatic agent, an antioxidant, a flame retardant, a thermal conductivity improver, and the like can be appropriately blended in.

A content of each of the components in the silicone rubber-based curable composition is not particularly limited, but it is set as follows, for example.

In the present embodiment, an upper limit value of a content of the silica particles (C) may be, for example, equal to or less than 60 parts by weight, is preferably equal to or less than 50 parts by weight, and is more preferably equal to or less than 35 parts by weight, with respect to 100 parts by weight as a total amount of the vinyl group-containing organopolysiloxane (A). Accordingly, it is possible to realize a balance with mechanical strength such as hardness and tensile strength. Furthermore, a lower limit value of a content of the silica particles (C) is not particularly limited, but it may be, for example, equal to or more than 20 parts by weight with respect to 100 parts by weight as a total amount of the vinyl group-containing organopolysiloxane (A).

Regarding the silane coupling agent (D), the silane coupling agent (D) is preferably contained in a proportion of, for example, equal to or more than 5 parts by weight and equal to or less than 100 parts by weight, and it is more preferably contained in a proportion of, for example, equal to or more than 5 parts by weight and equal to or less than 40 parts by weight, with respect to 100 parts by weight of the vinyl group-containing organopolysiloxane (A).

Accordingly, it is possible to reliably improve dispersibility of the silica particles (C) in the silicone rubber-based curable composition.

Regarding a content of the organohydrogenpolysiloxane (B), specifically, it is preferably contained in a proportion of, for example, equal to or more than 0.5 parts by weight and equal to or less than 20 parts by weight, and it is more preferably contained in a proportion of, for example, equal to or more than 0.8 parts by weight and equal to or less than 15 parts by weight, with respect to 100 parts by weight as a total amount of the vinyl group-containing organopolysiloxane (A), the silica particles (C), and the silane coupling agent (D). By setting the content of (B) within the above-mentioned range, a more effective curing reaction may be possible.

A content of platinum or the platinum compound (E) means a catalytic amount and can be set appropriately. Specifically, a content of platinum or the platinum compound (E) is such that platinum group metals in this component are 0.01 to 1,000 ppm a unit of weight, and are preferably 0.1 to 500 ppm in a unit of weight, with respect to a total amount of the vinyl group-containing organopolysiloxane (A), the silica particles (C), and the silane coupling agent (D). By setting the content of platinum or the platinum compound (E) to be equal to or more than the above-mentioned lower limit value, the obtained silicone rubber composition can be sufficiently cured. By setting the content of platinum or the platinum compound (E) to be equal to or less than the above-mentioned upper limit value, a curing rate of the obtained silicone rubber composition can be improved.

Furthermore, when water (F) is contained, a content thereof can be appropriately set. Specifically, a content thereof is within a range of, for example, 10 to 100 parts by weight, and is more preferably within a range of, for example, 30 to 70 parts by weight, with respect to 100 parts by weight of the silane coupling agent (D). Accordingly, it is possible to allow a reaction between the silane coupling agent (D) and the silica particles (C) to proceed more reliably.

<Method for Manufacturing Silicone Rubber>

Next, a method for manufacturing silicone rubber of the present embodiment will be described.

As the method for manufacturing silicone rubber of the present embodiment, a silicone rubber-based curable composition is prepared, the silicone rubber-based curable composition is cured, and thereby silicone rubber can be obtained.

The details will be described below.

First, each of the components of a silicone rubber-based curable composition is uniformly mixed with an arbitrary kneading device to prepare the silicone rubber-based curable composition.

[1] For example, a vinyl group-containing organopolysiloxane (A), silica particles (C), and a silane coupling agent (D) are weighed in predetermined amounts, and then kneaded with an arbitrary kneading device, and thereby a kneaded product containing each of these components (A), (C), and (D) is obtained.

The kneaded product is preferably obtained by kneading the vinyl group-containing organopolysiloxane (A) and the silane coupling agent (D) in advance, and thereafter kneading (mixing) the silica particles (C) thereto. Thereby, dispersibility of the silica particles (C) in the vinyl group-containing organopolysiloxane (A) is further improved.

In addition, when obtaining this kneaded product, water (F) may be added to the kneaded product of each of the components (A), (C), and (D), if necessary. Accordingly, it is possible to allow a reaction between the silane coupling agent (D) and the silica particles (C) to proceed more reliably.

Furthermore, kneading of each of the components (A), (C), and (D) is preferably performed through a first step of heating at a first temperature and a second step of heating at a second temperature. Accordingly, in the first step, a surface of the silica particles (C) can be surface-treated with the coupling agent (D), and in the second step, by-products generated by the reaction between the silica particles (C) and the coupling agent (D) can be reliably removed from the kneaded product. Thereafter, if necessary, the component (A) may be added to the obtained kneaded product and further kneaded. Thereby, affinity of the components in the kneaded product can be improved.

The first temperature is preferably about 40° C. to 120° C. for example, and is more preferably about 60° C. to 90° C., for example. The second temperature is preferably about 130° C. to 210° C. for example, and is more preferably about 160° C. to 180° C. for example.

In addition, an atmosphere in the first step is preferably an inert atmosphere such as a nitrogen atmosphere, and an atmosphere in the second step is preferably a reduced pressure atmosphere.

Furthermore, a time of the first step is, for example, preferably about 0.3 to 1.5 hours, and is more preferably about 0.5 to 1.2 hours. A time of the second step is, for example, preferably about 0.7 to 3.0 hours, and is more preferably about 1.0 to 2.0 hours.

By performing the first step and the second step under the above-mentioned conditions, the above-described effect can be more remarkably obtained.

[2] Next, a predetermined amount of the organohydrogenpolysiloxane (B) and platinum or the platinum compound (E) are weighed, and thereafter, the kneaded product prepared in the step [1] is kneaded with each of the components (B) and (E) using an arbitrary kneading device, and thereby the silicone rubber-based curable composition is obtained. The obtained silicone rubber-based curable composition may be a paste containing a solvent.

When kneading the components (B) and (E), it is preferable that the kneaded product prepared in the step [1] in advance be kneaded with the organohydrogenpolysiloxane (B), and the kneaded product prepared in the step [1] be kneaded platinum or the platinum compound (E), and thereafter the respective kneaded products be kneaded. Accordingly, each of the components (A) to (E) can be reliably dispersed in the silicone rubber-based curable composition without allowing a reaction to proceed between the vinyl group-containing organopolysiloxane (A) and the organohydrogenpolysiloxane (B).

A temperature at which each of the components (B) and (E) is kneaded is, for example, preferably about 10° C. to 70° C., and more preferably about 25° C. to 30° C., as a roll set temperature.

Furthermore, a time for kneading is, for example, preferably about 5 minutes to 1 hour, and more preferably about 10 to 40 minutes.

In the step [1] and the step [2], by setting the temperature within the above-mentioned range, it is possible to more adequately prevent or inhibit the reaction from proceeding between the vinyl group-containing organopolysiloxane (A) and the organohydrogenpolysiloxane (B). Furthermore, in the step [1] and step [2], by setting the kneading time within the above-mentioned range, it is possible to more reliably disperse each of the components (A) to (E) in the silicone rubber-based curable composition.

The kneading device used in each of the steps [1] and [2] is not particularly limited, but it is possible to use, for example, a kneader, two rolls, a Banbury mixer (continuous kneader), a pressure kneader, or the like.

Furthermore, in the step [2], a reaction inhibitor such as 1-ethynylcyclohexanol may be added to the kneaded product. Thereby, even when a temperature of the kneaded product is set to a relatively high temperature, it is possible to more adequately prevent or inhibit the reaction from proceeding between the vinyl group-containing organopolysiloxane (A) and the organohydrogenpolysiloxane (B).

[3] Next, the silicone rubber-based curable composition is cured to form silicone rubber.

In the present embodiment, in a step of curing the silicone rubber-based curable resin composition, for example, after heating (primary curing) at 100° C. to 250° C. for 1 to 30 minutes, post baking (secondary curing) at 200° C. for 1 to 4 hours is performed.

Through the above step, the silicone rubber of the present embodiment is obtained.

As a result of the studies, the inventors of the present invention have obtained the following findings. It has been elucidated that, when an amount of filler in the silicone rubber is reduced, hardness can be reduced, and tensile stress can be reduced, but on the other hand, tear strength is reduced, and thereby durability of the silicone rubber is reduced.

Accordingly, as a result of diligent studies, it was found that it is possible to control the uneven distribution of a crosslink density and a crosslinked structure by appropriately selecting a resin composition such as the vinyl group-containing organopolysiloxane (A), and to realize a low stress and a low hardness in a wide strain range, and thereby a tear strength of the silicone rubber can be increased. In addition, it was found that a tensile strength of the silicone rubber can be increased. Although the detailed mechanism is not clear, it is thought that uneven distribution of a cross-linked structure can be controlled by combined use of the high vinyl group-containing organopolysiloxane and the low vinyl group-containing organopolysiloxane, and therefore a hardness is reduced, but a tear strength of the silicone rubber is still increased. As above, breaking energy of the silicone rubber can be increased by increasing a tear strength while still maintaining other physical properties.

In the present embodiment, for example, by appropriately selecting the type and a blending amount of each of the components contained in the silicone rubber-based curable composition, a method of preparing the silicone rubber-based curable composition, a method for manufacturing the silicone rubber, and the like, it is possible to control a tensile stress, an elongation at break, a tensile strength, a tear strength, and a hardness. Among them, for example, use of a vinyl group-containing linear organopolysiloxane (A1-1) in which a content of vinyl groups is small and a vinyl group-containing linear organopolysiloxane (A1-2) in which a content of vinyl groups is large in combination; that fact that it is possible to control a crosslink density of a resin and uneven distribution of a crosslinked structure by using a vinyl group-containing organopolysiloxane (A) having a vinyl group at the terminal; a timing and ratio of addition of the vinyl group-containing organopolysiloxane (A), a blending ratio of the silica particles (C), surface modification of the silica particles (C) with the silane coupling agent (D); the fact that a reaction between the silane coupling agent (D) and the silica particles (C) can proceed more reliably by adding water; and the like can be mentioned as elements for setting the above-mentioned tensile stress, elongation at break, tensile strength, and tear strength within desired numerical value ranges.

In the present embodiment, when measuring a tensile stress, an elongation at break, a tensile strength, and a tear strength in the silicone rubber-based curable composition, a cured product of the silicone rubber-based curable composition may be used as a heating target and a measurement target. As this cured product, for example, sheet-shaped silicone rubber (cured product of silicone rubber-based curable composition), which is obtained by pressing a silicone rubber-based curable composition at 160° C. and 10 MPa for 20 minutes to form a sheet shape having a thickness of 1 mm, performing primary curing, and subsequently curing at 200° C. for 4 hours to perform secondary, may be used.

The embodiments of the present invention have been described above, but these are examples of the present invention, and various configurations other than the above examples can be adopted. Furthermore, the present invention is not limited to the above-described embodiment, and modifications, improvements, and the like within the scope of achieving the objects of the present invention are included in the present invention.

The elastomer of the present embodiment can be used to form a molded body.

Hereinafter, an example of a reference aspect will be additionally described.

1. A method of using an elastomer, including:
   a step of forming a molded body for low temperature environments by using the elastomer,
   in which the elastomer contains silicone rubber, and in the above-described elastomer, ((tensile stress $M_{100}$–tensile stress $M_{100}0$)/tensile stress $M_{100}0$)×100 measured under the following conditions is equal to or more than −20% and equal to or less than 13%.
(Conditions)
   Tensile stress $M_{100}$ at a given elongation: a stress at 100% elongation of the elastomer which is measured at −40° C. according to JIS K 6251 (2004) after maintaining the elastomer at −40° C. for 30 minutes.
   Tensile stress $M_{100}0$ at a given elongation: a stress at 100% elongation of the elastomer which is measured at 25° C. according to JIS K 6251 (2004) without subjecting the elastomer to a further cooling treatment.

2. A method of using an elastomer described in 1.,
   in which, in the above-described elastomer, ((elongation at break BE–elongation at break BE0)/elongation at break BE0)×100 measured under the following conditions is equal to or more than −40% and equal to or less than 20%.
(Conditions)
   Elongation at break BE: an elongation at break of the elastomer which is measured at −40° C. according to JIS K 6251 (2004) after maintaining the elastomer at −40° C. for 30 minutes.

Elongation at break BEG: an elongation at break of the elastomer which is measured at 25° C. according to JIS K 6251 (2004) without subjecting the elastomer to a further cooling treatment.

3. A method of using an elastomer described in 1, or 2.,
   in which, in the above-described elastomer, ((tensile strength S–tensile strength S0)/tensile strength S0)×100 measured under the following conditions is equal to or more than −20% and equal to or less than 80%.
(Conditions)
   Tensile strength S: a tensile strength of the elastomer which is measured at −40° C. according to JIS K 6251 (2004) after maintaining the elastomer at −40° C. for 30 minutes.
   Tensile strength S0: a tensile strength of the elastomer which is measured at 25° C. according to JIS K 6251 (2004) without subjecting the elastomer to a further cooling treatment.

4. A method of using an elastomer described in any one of 1. to 3.,
   in which, in the above-described elastomer, ((tear strength TS–tear strength TS0)/tear strength TS0)×100 measured under the following conditions is equal to or more than −20% and equal to or less than 120%.
(Conditions)
   Tear strength TS: a tear strength of the elastomer which is measured at −40° C. according to JIS K 6252 (2001) after maintaining the elastomer at −40° C. for 30 minutes.
   Tear strength TS0: a tear strength of the elastomer which is measured at 25° C. according to JIS K 6252 (2001) without subjecting the elastomer to a further cooling treatment.

5. A method of using an elastomer described in any one of 1. to 4.,
   in which, in the above-described elastomer, a hardness A0 measured under the following conditions is equal to or more than 20 and equal to or less than 80.
(Conditions)
   Hardness A0: a durometer hardness of the elastomer which is obtained at 25° C. without subjecting the elastomer to a further cooling treatment, where the durometer hardness is defined by JIS K 6253 (1997).

6. A method of using an elastomer described in any one of 1. to 5.,
   in which the elastomer contains an inorganic filling material.

7. A method of using an elastomer described in any one of 1. to 6.,
   in which, in the above-described step, a cool tolerance temperature of the molded body is −40° C.

8. A method of using an elastomer described in any one of 1. to 7.,
   in which, in the above-described step, the molded body is a wearable device.

Hereinafter, an example of a reference aspect will be additionally described.

1. An elastomer in which ((tensile stress $M_{100}$–tensile stress $M_{100}0$)/tensile stress $M_{100}0$)×100 measured under the following conditions is equal to or more than −20% and equal to or less than 100%.
(Conditions)
   Tensile stress $M_{100}$ at a given elongation: a stress at 100% elongation of the elastomer which is measured at −40° C. according to JIS K 6251 (2004) after maintaining the elastomer at −40° C. for 30 minutes.
   Tensile stress $M_{100}0$ at a given elongation: a stress at 100% elongation of the elastomer which is measured at 25°

C. according to JIS K 6251 (2004) without subjecting the elastomer to a further cooling treatment.

2. The elastomer described in 1.,
   in which ((elongation at break BE−elongation at break BEO)/elongation at break BEO)×100 measured under the following conditions is equal to or more than −40% and equal to or less than 20%.

(Conditions)

Elongation at break BE: an elongation at break of the elastomer which is measured at −40° C. according to JIS K 6251 (2004) after maintaining the elastomer at −40° C. for 30 minutes. Elongation at break BEG: an elongation at break of the elastomer which is measured at 25° C. according to JIS K 6251 (2004) without subjecting the elastomer to a further cooling treatment.

3. The elastomer described in 1, or 2.,
   in which ((tensile strength S−tensile strength S0)/tensile strength S0)×100 measured under the following conditions is equal to or more than −20% and equal to or less than 80%.

(Conditions)

Tensile strength S: a tensile strength of the elastomer which is measured at −40° C. according to JIS K 6251 (2004) after maintaining the elastomer at −40° C. for 30 minutes.

Tensile strength S0: a tensile strength of the elastomer which is measured at 25° C. according to JIS K 6251 (2004) without subjecting the elastomer to a further cooling treatment.

4. The elastomer described in any one of 1. to 3.,
   in which ((tear strength TS−tear strength TS0)/tear strength TS0)×100 measured under the following conditions is equal to or more than −20% and equal to or less than 120%.

(Conditions)

Tear strength TS: a tear strength of the elastomer which is measured at −40° C. according to JIS K 6252 (2001) after maintaining the elastomer at −40° C. for 30 minutes.

Tear strength TS0: a tear strength of the elastomer which is measured at 25° C. according to JIS K 6252 (2001) without subjecting the elastomer to a further cooling treatment.

5. The elastomer described in any one of 1. to 4.,
   in which a hardness A0 measured under the following conditions is equal to or more than 20 and equal to or less than 80.

(Conditions) Hardness A0: a durometer hardness of the elastomer which is obtained at 25° C. without subjecting the elastomer to a further cooling treatment, where the durometer hardness is defined by JIS K 6253 (1997).

6. The elastomer described in any one of 1. to 5.,
   in which the elastomer includes silicone rubber.

7. The elastomer described in any one of 1. to 6.,
   in which the elastomer includes an inorganic filling material.

8. A molded body including the elastomer described in any one of 1. to 7.

EXAMPLES

Hereinafter, the present invention will be described in detail with reference to examples, but the present invention is not limited to the description of these examples.

Raw material components used in examples and comparative examples shown in Table 1 are shown below.

(Vinyl Group-Containing Organopolysiloxane (A))

Vinyl group-containing linear organopolysiloxane (A1-1) in which a content of vinyl groups is small: vinyl group-containing dimethylpolysiloxane synthesized according to Synthesis Scheme 1 (a structure which is represented by Formula (1-1) and in which only $R^1$ (terminal) is a vinyl group).

Vinyl group-containing linear organopolysiloxane (A1-2) in which a content of vinyl groups is large: vinyl group-containing dimethylpolysiloxane synthesized according to Synthesis Scheme 2 (a structure which is represented by Formula (1-1) and in which $R^1$ and $R^2$ (terminal) are each a vinyl group).

(Organohydrogenpolysiloxane (B))

Product manufactured by Momentive: "TC-25D"

(Silica particles (C))

Silica particles (C): Silica fine particles (particle diameter 7 nm, specific surface area 300 $m^2/g$), "AEROSIL 300" manufactured by Nippon Aerosil Co., Ltd.

(Silane Coupling Agent (D))

Silane coupling agent (D-1): Hexamethyldisilazane (HMDZ), manufactured by Gelest, "HEXAMETHYLDISILAZANE (SIH 6110.1)"

Silane coupling agent (D-2): Divinyltetramethyldisilazane, manufactured by Gelest, "1,3-DIVINYLTETRAMETHYLDISILAZANE (SID 4612.0)"

(Platinum or Platinum Compound (E))

Product manufactured by Momentive: "TC-25A"

(Synthesis of vinyl group-containing organopolysiloxane (A)) [Synthesis Scheme 1: synthesis of vinyl group-containing linear organopolysiloxane (A1-1) in which a content of vinyl groups is small] A vinyl group-containing linear organopolysiloxane (A1-1) in which a content of vinyl groups is small was synthesized according to Formula (5).

That is, 74.7 g (252 mmol) of octamethylcyclotetrasiloxane and 0.1 g of potassium siliconate were put in a 300 mL separable flask having a cooling pipe and a stirring blade, which had been replaced with Ar gas. A temperature was raised, and the mixture was stirred at 120° C. for 30 minutes. At this time, an increase in viscosity could be confirmed.

Thereafter, the temperature was raised to 155° C., and stirring was continued for 3 hours. Next, after 3 hours, 0.1 g (0.6 mmol) of 1,3-divinyltetramethyldisiloxane was added, and the mixture was further stirred at 155° C. for 4 hours.

Furthermore, after 4 hours, the mixture was diluted with 250 mL of toluene and then washed with water 3 times. The washed organic layer was washed several times with 1.5 L of methanol to reprecipitate and to be purified, and the oligomer and the polymer were separated. The obtained polymer was dried under reduced pressure at 60° C. overnight to obtain a vinyl group-containing linear organopolysiloxane (A1-1) in which a content of vinyl groups is small (Mn=2, 2×10$^5$, Mw=4, 8×10$^5$). A content of vinyl groups calculated by H-NMR spectrum measurement was 0.04 mol %.

Formula (5)

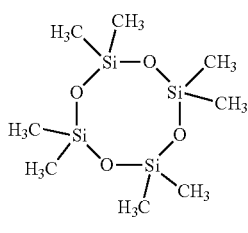

Octamethylcyclotetrasiloxane

| Potassium siliconate

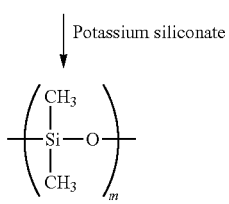

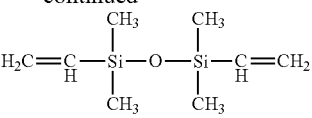

1,3-Divinyltetramethyldisiloxane

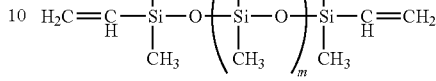

Vinyl group-containing dimethylpolysiloxane

[Synthesis Scheme 2: synthesis of vinyl group-containing linear organopolysiloxane (A1-2) in which a content of vinyl groups is large] A vinyl group-containing linear organopolysiloxane (A1-2) in which a content of vinyl groups is large was synthesized from Formula (6) by the same synthesis step for (A1-1) except that 0.86 g (2.5 mmol) of 2,4,6,8-tetramethyl-2,4,6,8-tetravinylcyclotetrasiloxane (0.1%) was used in addition to octamethylcyclotetrasiloxane (74.7 g, 252 mmol) in the synthesis step for (A1-1) (Mn=2,3×10$^5$, Mw=5, 0×10$^5$). A content of vinyl groups calculated by H-NMR spectrum measurement was 0.93 mol %.

Formula (6)

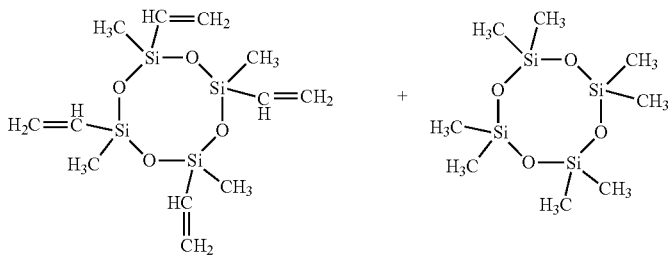

2,4,6,8-Tetramethyl-2,4,6,8-tetravinylcyclotetrasiloxane    Octamethylcyclotetrasiloxane

| Potassium siliconate

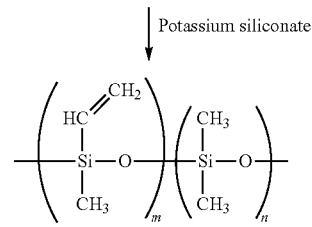

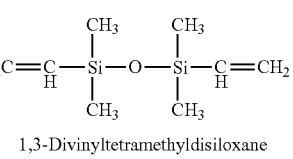

1,3-Divinyltetramethyldisiloxane

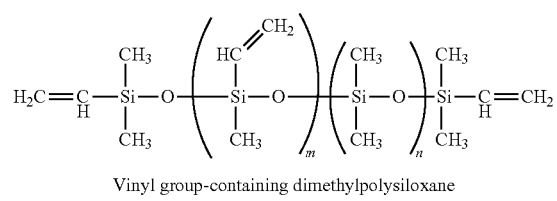

Vinyl group-containing dimethylpolysiloxane

Example 1: Preparation of Silicone Rubber-Based Curable Composition

In Example 1, a silicone rubber-based curable composition was prepared as follows. First, 90% of a mixture of a vinyl group-containing organopolysiloxane (A), a silane coupling agent (D), and water (F) was pre-kneaded in a ratio shown in Table 1, and thereafter, silica particles (C) were added to the mixture and further kneaded to obtain a kneaded product (silicone rubber compound).

Kneading after the addition of the silica particles (C) was performed through a first step of kneading for 1 hour under conditions of 60° C. to 90° C. under a nitrogen atmosphere for a coupling reaction, and a second step of kneading for 2 hours under conditions of 160° C. to 180° C. under a reduced pressure atmosphere for removing by-products (ammonia), and thereafter, cooling was performed, and the remaining 10% vinyl group-containing organopolysiloxane (A) was added in two portions and kneaded for 20 minutes.

Next, 1.81 parts by weight of organohydrogenpolysiloxane (TC-25D) and 0.5 part by weight of platinum or a platinum compound (TC-25A) were added to 100 parts by weight of the obtained kneaded product (silicone rubber compound), and the mixture was kneaded with a roll to obtain a silicone rubber-based curable composition.

Example 2: Preparation of Silicone Rubber-Based Curable Composition

In Example 2, a silicone rubber-based curable composition was prepared in the same manner as in Example 1. First, 90% of a mixture of a vinyl group-containing organopolysiloxane (A), a silane coupling agent (D), and water (F) was pre-kneaded in a ratio shown in Table 1, and thereafter, silica particles (C) were added to the mixture and further kneaded to obtain a kneaded product (silicone rubber compound).

Kneading after adding the silica particles (C) was performed in the same manner as in Example 1.

Next, 3.77 parts by weight of organohydrogenpolysiloxane (TC-25D) and 0.5 part by weight of platinum or a platinum compound (TC-25A) were added to 100 parts by weight of the obtained kneaded product (silicone rubber compound), and the mixture was kneaded with a roll to obtain a silicone rubber-based curable composition of Example 3.

Example 3: Preparation of Silicone Rubber-Based Curable Composition

In Example 3, a silicone rubber-based curable composition was prepared in the same manner as in Example 1. First, 90% of a mixture of a vinyl group-containing organopolysiloxane (A), a silane coupling agent (D), and water (F) was pre-kneaded in a ratio shown in Table 1, and thereafter, silica particles (C) were added to the mixture and further kneaded to obtain a kneaded product (silicone rubber compound).

Kneading after adding the silica particles (C) was performed in the same manner as in Example 1.

Next, 2.26 parts by weight of organohydrogenpolysiloxane (TC-25D) and 0.5 part by weight of platinum or a platinum compound (TC-25A) were added to 100 parts by weight of the obtained kneaded product (silicone rubber compound), and the mixture was kneaded with a roll to obtain a silicone rubber-based curable composition.

Example 4: Preparation of Silicone Rubber-Based Curable Composition

In Example 4, a silicone rubber-based curable composition was prepared in the same manner as in Example 1. First, 90% of a mixture of a vinyl group-containing organopolysiloxane (A), a silane coupling agent (D), and water (F) was pre-kneaded in a ratio shown in Table 1, and thereafter, silica particles (C) were added to the mixture and further kneaded to obtain a kneaded product (silicone rubber compound).

Kneading after adding the silica particles (C) was performed in the same manner as in Example 1.

Next, 4.53 parts by weight of organohydrogenpolysiloxane (TC-25D) and 0.5 part by weight of platinum or a platinum compound (TC-25A) were added to 100 parts by weight of the obtained kneaded product (silicone rubber compound), and the mixture was kneaded with a roll to obtain a silicone rubber-based curable composition of Example 4.

TABLE 1

| | | | Unit | Example 1 | Example 2 | Example 3 | Example 4 |
|---|---|---|---|---|---|---|---|
| Silicone rubber compound (kneaded product) | Vinyl group-containing organopolysiloxane (A) | (A1-1) | Part by mass | 80 | 80 | 80 | 80 |
| | | (A1-2) | | 20 | 20 | 20 | 20 |
| | Silica particle (C) | | | 25 | 25 | 50 | 50 |
| | Silane coupling agent (D) | (D-1) | | 10.0 | 10.0 | 9.5 | 9.5 |
| | | (D-2) | | 0.5 | 0.5 | 1.0 | 1.0 |
| | Water (F) | | | 5.25 | 5.25 | 5.25 | 5.25 |

(Production of Silicone Rubber)

In Examples 1 to 4, the obtained silicone rubber-based curable composition was pressed at 160° C. and 10 MPa for 20 minutes to form a sheet shape having a thickness of 1 mm, and primary curing was performed. Next, heating was performed at 200° C. for 4 hours, and it was regarded as secondary curing. In this manner, sheet-shaped silicone rubber (cured product of the silicone rubber-based curable composition) was obtained.

The obtained sheet-shaped silicone rubber (sheet-shaped elastomer) was evaluated based on the following evaluation items. Evaluation results are shown in Table 2. Regarding a tensile stress, an elongation at break, and a tensile strength, three samples were used, and an average value of the three samples was used as a measurement value. Regarding a tear strength, five samples were used, and an average value of the five samples was used as a measurement value. Regarding a hardness, two samples were used, each sample was measured at n=5, and an average value of a total of 10 measurements was used as a measurement value. Each average value is shown in Table 2.

Comparative Example 1

Using a natural rubber sheet (thickness 1 mm, width 500 mm×length 500 mm, As One product code 2-9289-02) purchased from AS ONE Co., Ltd., test pieces described in each characteristic evaluation were produced, and the following evaluations were performed. Regarding evaluation results, the number of samples and the number of evaluations were the same as those described in the production of the silicone rubber.

Comparative Example 2

Using a chloroprene rubber sheet (thickness 1 mm, width 500 mm×length 500 mm, As One product code 2-9293-02) purchased from AS ONE Co., Ltd., test pieces described in each characteristic evaluation were produced, and the following evaluations were performed. Regarding evaluation results, the number of samples and the number of evaluations were the same as those described in the production of the silicone rubber.

Comparative Example 3

Using a polyester urethane sheet (thickness 1 mm, width 500 mm×length 500 mm, rubber product code 10004-0001-2-0) purchased from Fuso Rubber Industry Co., Ltd., test pieces described in each characteristic evaluation were produced, and the following evaluations were performed. Regarding evaluation results, the number of samples and the number of evaluations were the same as those described in the production of the silicone rubber.

Comparative Example 4

Using a fluororubber sheet (thickness 1 mm, width 500 mm×length 500 mm, MISUMI product code RBLM1-500) purchased from MISUMI Co., Ltd., test pieces described in each characteristic evaluation were produced, and the following evaluations were performed. Regarding evaluation results, the number of samples and the number of evaluations were the same as those described in the production of the silicone rubber.

Comparative Example 5

Using an ethylene propylene rubber sheet (thickness 1 mm, width 500 mm×length 500 mm, As One product code 2-9301-02) purchased from AS ONE Co., Ltd., test pieces described in each characteristic evaluation were produced, and the following evaluations were performed. Regarding evaluation results, the number of samples and the number of evaluations were the same as those described in the production of the silicone rubber.

Comparative Example 6

Using a nitrile rubber sheet (thickness 1 mm, width 300 mm×length 300 mm, As One product code 2-9305-01) purchased from AS ONE Co., Ltd., test pieces described in each characteristic evaluation were produced, and the following evaluations were performed. Regarding evaluation results, the number of samples and the number of evaluations were the same as those described in the production of the silicone rubber.

| Measurement temperature: −40° C. | | | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Hardness | A0 | No treatment | 30.3 | 40.2 | 59.9 | 68.9 | 60.6 | 60.0 | 70.5 | 62.2 | 60.3 | 59.3 |
| Tensile strength | S0 | No treatment | 10.3 | 9.7 | 11.0 | 10.8 | 3.7 | 7.0 | 30.1 | 7.0 | 9.7 | 9.8 |
| | S | At −40° C. | 11.6 | 11.2 | 12.3 | 12.9 | 7.6 | 15.7 | 61.4 | 50.5 | 18.3 | 32.2 |
| | (S − S0)/S0 × 100 (%) | | 13 | 15 | 12 | 19 | 103 | 125 | 104 | 625 | 88 | 228 |
| Tear strength | TS0 | No treatment | 45.5 | 48.4 | 56.3 | 54.2 | 11.9 | 12.5 | 24.1 | 13.5 | 21.0 | 22.6 |
| | TS | At −40° C. | 44.2 | 52.1 | 69.2 | 71.8 | 46.0 | 64.1 | 205.7 | 31.2 | 99.2 | 102.9 |
| | (TS − TS0)/TS0 × 100 (%) | | −3 | 8 | 23 | 33 | 288 | 411 | 754 | 131 | 373 | 354 |
| Elongation at break | BE0 | No treatment | 887 | 531 | 498 | 335 | 212 | 230 | 724 | 230 | 262 | 357 |
| | BE | At −40° C. | 862 | 520 | 473 | 353 | 140 | 113 | 373 | 4 | 133 | 4 |
| | (BE − BE0)/BE0 × 100 (%) | | −3 | −2 | −5 | 5 | −34 | −51 | −48 | −98 | −49 | −99 |
| 100% Modulus | $M_{100}0$ | No treatment | 1.1 | 2.2 | 3.1 | 5.4 | 1.9 | 3.0 | 3.8 | 2.9 | 4.1 | 2.9 |
| | $M_{100}$ | At −40° C. | 1.1 | 2.1 | 3.5 | 6.1 | 5.9 | 14.8 | 18.1 | Broken | 16.3 | Broken |
| | $(M_{100} - M_{100}0)/M_{100}0 × 100$ (%) | | −2 | −4 | 13 | 12 | 211 | 398 | 378 | Could not be calculated | 295 | Could not be calculated |

(Hardness: Durometer Hardness)

Six sheets of the obtained sheet-shaped silicone rubber of each example and sheet-shaped elastomer of each comparative example, which had a thickness of 1 mm, were laminated to produce a 6-mm test piece. The obtained test piece was measured for a type A durometer hardness (hardness A0) at 25° C. according to JIS K6253 (1997) without performing a further cooling treatment.

<Tensile Strength>

Using the obtained sheet-shaped silicone rubber of each example and the sheet-shaped elastomer of each comparative example, which had a thickness of 1 mm, according to JIS K 6251 (2004) a type 3 dumbbell-shaped test piece was produced, and a tensile strength of the type 3 dumbbell-shaped test piece was measured. The unit was MPa.

(Measurement Conditions for Tensile Strength)

Tensile strength S: a tensile strength of the type 3 dumbbell-shaped test piece which was measured at −40° C.

according to JIS K 6251 (2004) after maintaining the type 3 dumbbell-shaped test piece at −40° C. for 30 minutes.

Tensile strength S0: a tensile strength of the type 3 dumbbell-shaped test piece which was measured at 25° C. according to JIS K 6251 (2004) without subjecting the type 3 dumbbell-shaped test piece to a further cooling treatment.
<Tear Strength>

Using the obtained sheet-shaped silicone rubber of each example and the sheet-shaped elastomer of each comparative example, which had a thickness of 1 mm, according to JIS K 6252 (2001) a crescent-shaped test piece was produced, and a tear strength of the crescent-shaped test piece was measured. The unit was N/mm.
(Measurement Conditions for Tear Strength)

Tear strength TS: a tear strength of the crescent-type test piece which was measured at −40° C. according to JIS K 6252 (2001) after maintaining the crescent-type test piece at −40° C. for 30 minutes.

Tear strength TS0: a tear strength of the crescent-type test piece which was measured at 25° C. according to JIS K 6252 (2001) without subjecting the crescent-type test piece to a further cooling treatment.
<Elongation at Break>

Using the obtained sheet-shaped silicone rubber of each example and the sheet-shaped elastomer of each comparative example, which had a thickness of 1 mm, according to JIS K 6251 (2004) a type 3 dumbbell-shaped test piece was produced, and an elongation at break of the type 3 dumbbell-shaped test piece was measured. The elongation at break was calculated by [movement distance between chucks (mm)]/[distance between initial chucks (60 mm)]×100. The unit was %.
(Measurement Conditions for Elongation at Break)

Elongation at break BE: an elongation at break of the type 3 dumbbell-shaped test piece which was measured at −40° C. according to JIS K 6251 (2004) after maintaining the type 3 dumbbell-shaped test piece at −40° C. for 30 minutes.

Elongation at break BEG: an elongation at break of the type 3 dumbbell-shaped test piece which was measured at 25° C. (room temperature) according to JIS K 6251 (2004) without subjecting the type 3 dumbbell-shaped test piece to a further cooling treatment.
<Tensile Stress>

Using the obtained sheet-shaped silicone rubber of each example and the sheet-shaped elastomer of each comparative example, which had a thickness of 1 mm, according to JIS K 6251 (2004) a type 3 dumbbell-shaped test piece was produced, and a tensile stress M at a given elongation % of the type 3 dumbbell-shaped test piece was measured at a tensile speed of 500 mm/min. The unit was MPa.
(Measurement Conditions for Tensile Stress)

Tensile stress $M_{100}$: a tensile stress at 100% elongation of the type 3 dumbbell-shaped test piece which was measured at −40° C. after maintaining the type 3 dumbbell-shaped test piece at −40° C. for 30 minutes.

Tensile stress $M_{100}0$: a tensile stress at 100% elongation of the type 3 dumbbell-shaped test piece which was measured at 25° C. without subjecting the type 3 dumbbell-shaped test piece to a further cooling treatment.
<Wearable Substrate>

A plate-shaped member (wearable substrate) having a thickness of 1 mm×length: 50 mm×width: 20 mm was prepared using the sheet-shaped silicone rubber of the example and the sheet-shaped elastomer of each comparative example. The obtained plate-shaped member was placed in a cooler having an internal environment of −40° C. and kept for 30 minutes. The plate-shaped member was taken out of the cooler, held at both ends with both hands, and subjected to the following bending and elongation test and durability test.

Bending and Elongation Test:

A test of bending at 90 degrees was carried out with both ends of the plate-shaped member held by both hands, and the easiness of deformation of the plate-shaped member was judged by the ease of bending the plate-shaped member from the start of bending to the end of bending. During the bending test of plate-shaped members, a plate-shaped member in which a load was not felt when bending the plate-shaped member was evaluated as A, a plate-shaped member in which a load was felt when bending the plate-shaped member was evaluated as B, a plate-shaped member broken when the plate-shaped member was bent was evaluated as C. The evaluation results are shown in Table 3.

Durability test: The above bending and elongation test (finger bending test) was repeated 50 times, and the durability of the plate-shaped member was judged based on the presence or absence of damage.

A plate-shaped member that did not have abnormal appearance after the test was evaluated as "A," a plate-shaped member that had a crack or damage after the test was evaluated as "C," and a plate-shaped member that was cracked during the test was evaluated as "-." The evaluation results are shown in Table 3.

| | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|
| Bending and elongation test | A | A | A | A | B | B | B | C | B | C |
| Durability test | A | A | A | A | C | C | C | — | C | — |

It was found that the elastomers (silicone rubbers) of Examples 1 to 4 were excellent in deformability in low temperature environments as compared with Comparative Examples 1 to 6. Furthermore, it was found that the elastomers (silicone rubbers) of Examples 1 to 4 were superior to Comparative Examples 1 to 6 in durability in repeated use in low temperature environments. The elastomers (silicone rubbers) of Examples 1 to 4 described above are expected to be suitably used for wearable devices that require use characteristics at low temperatures, because variations in rubber characteristics in low temperature environments are inhibited.

This application claims priority on the basis of Japanese Patent Application No. 2018-110490 filed Jun. 8, 2018, and incorporates all of its disclosures herein.

The invention claimed is:
1. An elastomer used for a molded body for low temperature environments, the elastomer comprising:

silicone rubber which is composed of a cured product of a silicone rubber-based curable composition including a vinyl group-containing organopolysiloxane (A), organohydrogenpolysiloxane (B), silica particles (C) and, silane coupling agent (D), and platinum or a platinum compound (E), wherein, the vinyl group-containing organopolysiloxane (A) includes a vinyl group-containing linear organopolysiloxane (A1-1) having a content of vinyl groups equal to or less than 0.4 mol % and vinyl group-containing linear organopolysiloxane (A1-2) in which a content of the vinyl groups is 0.5 to 15 mol %, wherein, a content of the silica particles (C) is equal to or less than 35 parts by weight, with respect to 100 parts by weight as a total amount of the vinyl group-containing organopolysiloxane (A), wherein a content of the organohydrogenpolysiloxane (B) is equal to or more than 0.5 parts by weight and equal to or less than 20 parts by weight with respect to 100 parts by weight as a total amount of the vinyl group-containing organopolysiloxane (A), the silica particles (C), and the silane coupling agent (D), the silane coupling agent (D) includes a silane coupling agent having a hydrophobic group (D-1) which is different from the vinyl groups and a silane coupling agent (D-2) having a vinyl group, wherein ((tensile stress $M_{100}$–tensile stress $M_{100}0$)/tensile stress $M_{100}0$)×100 measured under the following conditions is equal to or more than −20% and equal to or less than 13%, (conditions)

tensile stress $M_{100}$ at a given elongation: a stress at 100% elongation of the elastomer which is measured at −40° C. according to JIS K 6251 (2004) after maintaining the elastomer at −40° C. for 30 minutes, and tensile stress $M_{100}0$ at a given elongation: a stress at 100% elongation of the elastomer which is measured at 25° C. according to JIS K 6251 (2004) without subjecting the elastomer to a further cooling treatment.

2. The elastomer according to claim 1, wherein ((elongation at break BE–elongation at break BE0)/elongation at break BE0)×100 measured under the following conditions is equal to or more than −40% and equal to or less than 20%, (conditions)

elongation at break BE: an elongation at break of the elastomer which is measured at −40° C. according to JIS K 6251 (2004) after maintaining the elastomer at −40° C. for 30 minutes, and elongation at break BE0: an elongation at break of the elastomer which is measured at 25° C. according to JIS K 6251 (2004) without subjecting the elastomer to a further cooling treatment.

3. The elastomer according to claim 1, wherein ((tensile strength S–tensile strength S0)/tensile strength S0)×100 measured under the following conditions is equal to or more than −20% and equal to or less than 80%, (conditions)

tensile strength S: a tensile strength of the elastomer which is measured at −40° C. according to JIS K 6251 (2004) after maintaining the elastomer at −40° C. for 30 minutes, and tensile strength S0: a tensile strength of the elastomer which is measured at 25° C. according to JIS K 6251 (2004) without subjecting the elastomer to a further cooling treatment.

4. The elastomer according to claim 1, wherein ((tear strength TS–tear strength TS0)/tear strength TS0)×100 measured under the following conditions is equal to or more than −20% and equal to or less than 120%, (conditions)

tear strength TS: a tear strength of the elastomer which is measured at −40° C. according to JIS K 6252 (2001) after maintaining the elastomer at −40° C. for 30 minutes, and tear strength TS0: a tear strength of the elastomer which is measured at 25° C. according to JIS K 6252 (2001) without subjecting the elastomer to a further cooling treatment.

5. The elastomer according to claim 1, wherein a hardness AC measured under the following conditions is equal to or more than 20 and equal to or less than 80, (conditions)

hardness A0: a durometer hardness of the elastomer which is obtained at 25° C. without subjecting the elastomer to a further cooling treatment, where the durometer hardness is defined by JIS K 6253 (1997).

6. The elastomer according to claim 1, wherein the elastomer is used for the molded body having a cool tolerance temperature of −40° C.

7. The elastomer according to claim 1, wherein the molded body is a wearable device.

8. A molded article for low temperature environments, comprising:

the elastomer according to claim 1.

9. The elastomer according to claim 1, wherein the silane coupling agent having the hydrophobic group includes methyltrimethoxysilane, dimethyldimethoxysilane, phenyltrimethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, and decyltrimethoxysilane, methyltrichlorosilane, dimethyldichlorosilane, trimethylchlorosilane, phenyltrichlorosilane, or hexamethyldisilazane.

10. The elastomer according to claim 1, wherein the silane coupling agent having the vinyl group includes methacryloxypropyltriethoxysilane, methacryloxypropyltrimethoxysilane, methacryloxypropylmethyldiethoxysilane, methacryloxypropylmethyldimethoxysilane, vinyltriethoxysilane, vinyltrimethoxysilane, and vinylmethyldimethoxysilane, vinyltrichlorosilane, vinylmethyldichlorosilane, or divinyltetramethyldisilazane.

11. The elastomer according to claim 1, wherein, tensile stress $M_{100}0$ at a given elongation: a stress at 100% elongation of the elastomer which is measured at 25° C. according to JIS K 6251 (2004) without subjecting the elastomer to a further cooling treatment is 1.1 MPa or more.

12. The elastomer according to claim 1, wherein, tensile strength S0: a tensile strength of the elastomer which is measured at 25° C. according to JIS K 6251 (2004) without subjecting the elastomer to a further cooling treatment is 9.7 MPa or more.

13. The elastomer according to claim 1, wherein, elongation at break BE0: an elongation at break of the elastomer which is measured at 25° C. according to JIS K 6251 (2004) without subjecting the elastomer to a further cooling treatment is 335% or more.

14. The elastomer according to claim 1, wherein the content of the silica particles (C) is equal to or less than 25 parts by weight, with respect to 100 parts by weight as a total amount of the vinyl group-containing organopolysiloxane (A).

* * * * *